United States Patent
Yamada et al.

(10) Patent No.: US 10,909,468 B2
(45) Date of Patent: Feb. 2, 2021

(54) LARGE-SCALE ANOMALY DETECTION WITH RELATIVE DENSITY-RATIO ESTIMATION

(71) Applicant: Oath Inc., New York, NY (US)

(72) Inventors: Makoto Yamada, San Jose, CA (US); Chao Qin, Sunnyvale, CA (US); Hua Ouyang, Sunnyvale, CA (US); Achint Thomas, Sunnyvale, CA (US); Yi Chang, Sunnyvale, CA (US)

(73) Assignee: Verizon Media Inc., New York, NY (US)

( * ) Notice: Subject to any disclaimer, the term of this patent is extended or adjusted under 35 U.S.C. 154(b) by 598 days.

(21) Appl. No.: 14/634,515

(22) Filed: Feb. 27, 2015

(65) Prior Publication Data
US 2016/0253598 A1 Sep. 1, 2016

(51) Int. Cl.
*G06F 21/55* (2013.01)
*G06N 20/00* (2019.01)

(52) U.S. Cl.
CPC .......... *G06N 20/00* (2019.01); *G06F 21/552* (2013.01)

(58) Field of Classification Search
CPC ....................................................... G06N 5/04
USPC ........................................................ 706/12
See application file for complete search history.

(56) References Cited

U.S. PATENT DOCUMENTS

| | | | | |
|---|---|---|---|---|
| 5,864,807 | A * | 1/1999 | Campbell | G10L 17/04 704/244 |
| 6,754,380 | B1 * | 6/2004 | Suzuki | G06K 9/32 382/156 |
| 2011/0173142 | A1 * | 7/2011 | Dasgupta | G06N 20/00 706/12 |
| 2012/0246097 | A1 * | 9/2012 | Jain | G06F 17/30705 706/12 |
| 2013/0041966 | A1 * | 2/2013 | Duan | H04L 63/0245 709/206 |
| 2016/0226894 | A1 * | 8/2016 | Lee | H04L 63/1416 |

OTHER PUBLICATIONS

Ye et al (Stochastic Gradient Boosted Distributed Decision Trees 2009) (Year: 2009).*
Yevseyeva et al ("Optimising anti-spam filters with evolutionary algorithms" 2013) (Year: 2013).*
Blanzieri, Enrico et al., "A survey of learning-based techniques of email spam filtering," University of Trento, Italy, Information Engineering and Computer Science Departmentm Technical Report #DIT-06-056, Jan. 2008.
Hido, Shohei et al., "Statistical outlier detection using direct density ratio estimation," Knowledge and Information Systems, vol. 26, No. 2, pp. 309-336, 2011.

(Continued)

*Primary Examiner* — Lut Wong
(74) *Attorney, Agent, or Firm* — Cooper Legal Group, LLC (57) ABSTRACT

In one embodiment, a set of training data consisting of inliers may be obtained. A supervised classification model may be trained using the set of training data to identify outliers. The supervised classification model may be applied to generate an anomaly score for a data point. It may be determined whether the data point is an outlier based, at least in part, upon the anomaly score.

22 Claims, 6 Drawing Sheets

(56) References Cited

OTHER PUBLICATIONS

Sugiyama, Masashi et al., "Direct importance estimation with model selection and its application to covariate shift adaptation," Advances in neural information processing systems, pp. 1433-1440, 2008.
Yamada, Makoto et al., "Relative density-ratio estimation for robust distribution comparison," Neural computation 25(5): 1324-1370, 2013.
Smola, Alex J. et al., "Relative novelty detection," International conference on artificial intelligence and statistics, 536-543, 2009.
Breunig, Markus M. et al., "LOF: Identifying density-based local outliers," ACM Sigmod Record, vol. 29, 93-104, 2000.
Friedman, Jerome H., "Greedy function approximation: a gradient boosting machine," 1999 Reitz lecture, The Annals of Statistics 2001, vol. 29, No. 5, 1189-1232.
Kanamori, Takafumi et al, "A least-squares approach to direct importance estimation," Journal of Machine Lerning Research 10 (2009) 1391-1445, Jul. 2009.
Chang, Chih-Chung et al., "LIBSVM: a library for support vector machines," ACM Transactions on Intelligent Systems and Technology 2:27:1-27:27, 2011.
Huang, Jiayuan et al., "Correcting sample selection bias by unlabeled data," Advances in neural information processing systems, 601-608, 2006.
Bradley, Andrew P., "The use of the area under the ROC curve in the evaluation of machine learning algorithms," Pattern Recognition 30:1145-1159, 1997.
Schölkopf, Bernhard et al., "Estimating the support of a high-dimensional distribution," Neural Computation 13(7):1443-1471, 2001.
Cortes, Corinna et al., "Support-Vector Networks," Machine Learning, 20, 273-297 (1995).

\* cited by examiner

LARGE-SCALE ANOMALY DETECTION WITH RELATIVE DENSITY-RATIO ESTIMATION

BACKGROUND OF THE INVENTION

The disclosed embodiments relate generally to computer-implemented methods and apparatus for performing anomaly detection.

In data mining, anomaly detection typically refers to the identification of items, events, or observations which do not conform to an expected pattern or other items in a dataset. Anomaly detection is an important tool for detecting fraud, network intrusion, and other rare events.

One common use of anomaly detection is in detecting malicious users. For example, detecting spare and compromised accounts in electronic mail systems is a significant concern. As another example, detecting fraudulent users is an ongoing issue in online auction systems.

One of the key challenges in detecting malicious users is that malicious user behavior changes quickly. As a result, it is difficult to collect examples of malicious user behavior to train a supervised classifier.

SUMMARY OF THE INVENTION

In one embodiment, a set of training data consisting of inliers may be obtained. A supervised classification model may be trained using the set of training data to identify outliers. The supervised classification model may be applied to generate an anomaly score for a data point. It may be determined whether the data point is an outlier based, at least in part, upon the anomaly score.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Example System

Figure 1:
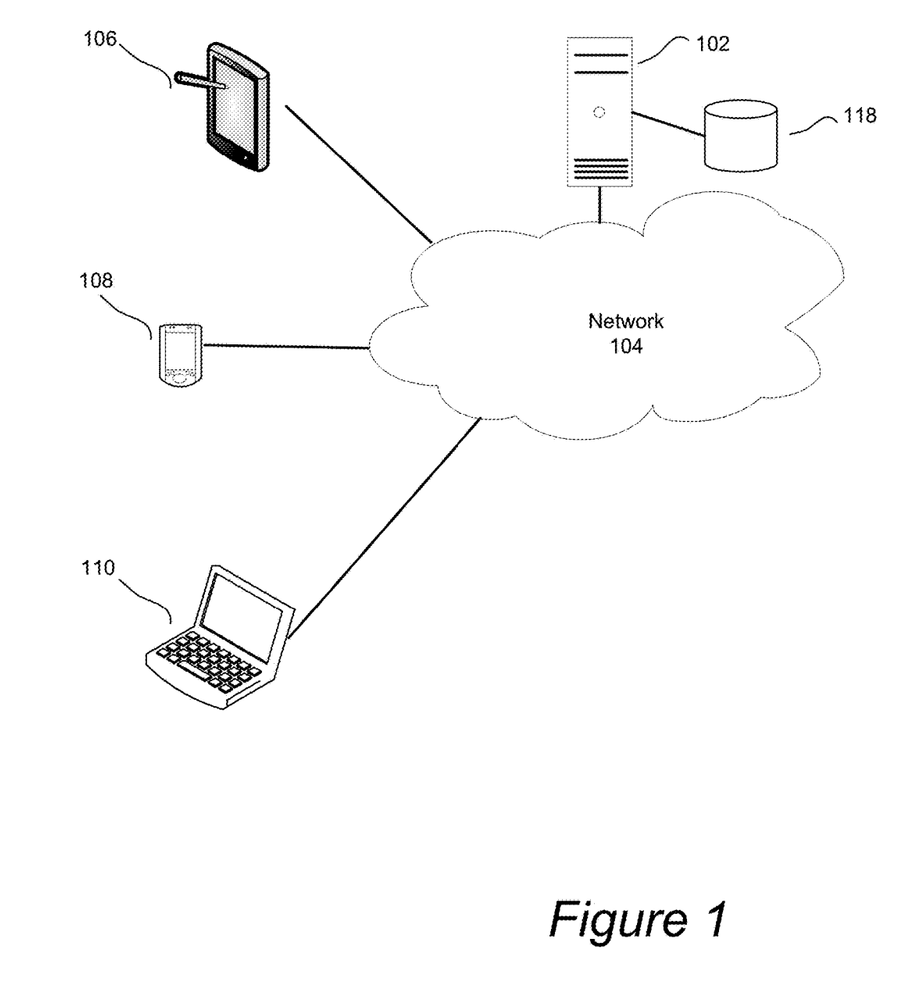
FIG. 1 is a diagram illustrating an example system in which embodiments of the invention may be implemented.

FIG. 1 is a diagram illustrating an example system in which various embodiments may be implemented. As shown in FIG. 1, the system may include one or more servers 102 associated with a web site such as a social networking web site. Examples of social networking web sites include Yahoo, Facebook, Tumblr, LinkedIn, Flickr, and Meme. The server(s) 102 may enable the web site to provide a variety of services to its users. More particularly, the server(s) 102 may include a web server, search server, an email server, and/or content server.

In accordance with various embodiments, the server(s) 102 may perform anomaly detection to detect anomalies in a dataset. More particularly, an anomaly detection model may determine whether a data point is typical for a given distribution or not. An atypical data point may be referred to as an outlier.

Outliers are cases that are unusual because they fall outside the distribution that is considered normal for the data. The distance from the center of a normal distribution indicates how typical a given point is with respect to the distribution of the data.

Anomaly detection may be performed for a variety of purposes. For example, the dataset may include security data or user data such as voice data, enabling speaker verification to be performed or security breaches to be detected. As another example, the dataset may include data pertaining to emails or user accounts such as email accounts, enabling spammers or fraudulent accounts to be identified. As yet another example, the dataset may include data such as image data associated with products such as semiconductors, enabling defective semiconductors to be identified.

A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on web sites, in applications, or other places where users are more likely to see them, such as during an online session.

Service providers have rapidly expanded into many areas that allow users to interact with various resources and other users in a multitude of ways. For example, users may store and share photographs and video through a dedicated photo sharing web property. In another brief example, users may obtain and share news on a dedicated news related web property.

In accordance with various embodiments, a plurality of web properties may be accessed via a web portal. Each web property may include a plurality of web pages. Example web properties include Mail, News, Sports, Finance, Weather, Autos, Homes, Dating, Jobs, Shopping, Parenting, Health, Style, Beauty, Food, Movies, Travel, Answers, Careers, Celebrity, Fantasy Baseball, Fantasy Football, Fantasy Sports, Flickr, Games, Groups, Horoscopes, Local, Maps, Messenger, Music, Search, Small Business, Tech, and TV.

A plurality of clients 106, 108, 110 may access a web service on a web server via a network 104. For example, the clients 106, 108, 110 may view web pages of the web site. More particularly, the clients 106, 108, 110 may access web pages of a web property via a web portal associated with the web server. As another example, the clients 106, 108, 110 may send or receive emails.

In accordance with various embodiments, as emails are sent or received, a network device may extract values of features from the emails. For example, the features for which values are extracted from a given email may include email addresses of the sender and receiver(s), as well as a time that the email was sent. Values of additional features pertaining to a sender or receiver of an email may also be obtained by identifying a corresponding profile of the sender or receiver. A profile of a sender or receiver of an email may also be referred to as a user profile. An example user profile will be described in further detail below.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

Embodiments disclosed herein may be implemented via the server(s) 102 and/or the clients 106, 108, 110. For example, various features may be implemented via a web browser and/or application on the clients 106, 108, 110. The disclosed embodiments may be implemented via software and/or hardware.

Anomaly detection may be performed based, at least in part, upon values of a set of one or more features corresponding to each data point. More particularly, a supervised model used for anomaly detection may be trained using a dataset consisting of inliers, where the dataset includes feature values of the set of features corresponding to each data point in the dataset. It is then possible to apply the supervised model to feature values of the set of features for a given data point to determine whether the data point is an outlier or an inlier.

In accordance with various embodiments, the set of features may include features pertaining to user accounts, users, and/or emails. Values of various features pertaining to an email may be extracted from the email and/or obtained via a lookup process. For example, values of one or more features may be extracted from the email upon receipt of the email by a network device. Features pertaining to an email may include, for example, an email address of the sender of the email, an email address of each the addressee(s) of the email, and a time that the email was sent. Values of features pertaining to a user (e.g., sender and/or addressee) or corresponding user account may be obtained via a lookup in a corresponding user profile. As will be described in further detail below, values of features pertaining to users (e.g., senders and/or addressees) may be maintained in user profiles.

In other embodiments, the dataset may include feature values of features pertaining to digital voice data and/or digital image data. Thus, feature values of various features may be extracted from digital data such as digital voice or digital image data. For example, values of one or more features may be extracted from the digital data by a network device upon receipt of the digital data. In a speaker verification system, values of features corresponding to speaker data maintained in a user profile may be implemented as inliers to train a supervised model to identify impostors or malicious users posing as the user. In an image verification system, profiles pertaining to inliers may include feature values of image data corresponding to products (e.g., semiconductors) that are considered to be fabricated accurately. Feature values from these profiles may be implemented as inliers to train a supervised model used to identify faulty products. The trained supervised model may then be used to determine whether the extracted feature values of the digital data corresponds to an inlier or an outlier.

A variety of mechanisms may be implemented to support the generation of user profiles including, but not limited to, collecting or mining navigation history, stored documents, tags, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

In accordance with various embodiments, the server(s) 102 may have access to one or more user logs 118 (e.g., user databases) into which user information is retained for each of a plurality of users. This user information or a portion thereof may be referred to as a user profile. More particularly, the user profile may include public information that is available in a public profile and/or private information. The user logs 118 may be retained in one or more memories that are coupled to the server 102.

The user information retained in the user logs 118 may indicate a plurality of features for each user. More particularly, the features may include personal information such as demographic information (e.g., age, occupation, and/or gender) and/or geographic information (e.g., residence address, work address, zip code, and/or area code). In addition, each time a user performs online activities such as clicking on a web page (or region thereof) or an advertisement, or purchasing goods or services, information regarding such activity or activities may be retained as user data in the user logs 118. For instance, the user data that is retained in the user logs 118 may indicate the identity of web sites visited, identity of ads that have been selected (e.g., clicked on) and/or a timestamp. In addition, the features may indicate a purchase history with respect to one or more products, one or more types of products, one or more services, and/or one or more types of services. Additional features may indicate one or more interests of the user.

The user logs 118 may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., Uniform Resource Locators (URLs)), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

Anomaly Detection

In commercial e-mail systems, the number of spam e-mails has increased dramatically in recent years. As a result, users spend a great deal of time handling spam messages. This highly degrades the user experience in commercial e-mail service, and ends up decreasing the total number of active users. Recently, in order to maximize the effectiveness of spamming campaigns to users in the system, spammers take over an existing account of another user and then start sending spam messages to the contacts of the compromised account. Therefore, to improve the user's experience in commercial e-mail services, efficiently detecting compromised e-mail accounts is of paramount importance.

One popular approach used to detect compromised e-mail accounts is to manually create a set of rules from existing spammer data and calculate a compromised-ness score of each e-mail account with the set of rules. If the score associated with an e-mail account exceeds a pre-defined threshold, the mail account is detected as a compromised account. Since the rule based method is easy to implement, it is widely used in commercial spam detection systems. However, since the behavior of spammers changes dynamically, it is difficult to manually create and maintain a set of rules that accurately reflects the behavior of spammers.

Another popular approach used to detect compromised e-mail accounts is to use supervised machine learning techniques such as a support vector machine (SVM) to learn a classifier to detect compromised e-mails. However, this approach typically requires a training dataset consisting of both compromised and non-compromised emails. While non-compromised samples may be found in abundance, samples corresponding to compromised emails are difficult to obtain. Moreover, since the spammer behavior often changes once they are detected by the system, the training dataset needs to be updated frequently. As a result, this approach is generally very expensive and not practical in commercial services.

As discussed above, existing methods used to detect spammers rely heavily on observed past spam data. Unfortunately, spammers have become more sophisticated in an attempt to bypass spam detection schemes. More particularly, a key challenge in performing spam detection arises since the spammer behavior changes rapidly. As a result, it is difficult to collect a representative training dataset to learn the rules or train the supervised classifier. Moreover, these models/heuristics need to be periodically updated to keep up with the dynamic spammer trends. Another challenge is that the number of data samples tends to be hundreds of millions, which require scalable algorithms for learning.

In accordance with various embodiments, an inlier-based anomaly detection method may be applied to identify an anomaly (e.g., compromised account) in a test dataset based on a training dataset consisting only inliers (e.g., non-compromised accounts (inliers). In other words, a training dataset including outliers (e.g., compromised accounts) is not required to perform accurate detection of such outliers. In practice, this inlier-based approach is reasonable for performing anomaly detection for situations such as compromised e-mail account detection, since it is relatively easy to obtain non-compromised data by monitoring emails.

In accordance with various embodiments, a relative importance measure, which is defined as a ratio of training and test probability densities, may be employed as an anomaly score. The relative importance estimation problem may then be formulated as a two-class classification problem and gradient boosting decision trees (GBDT) may be used to estimate it. A two-class classification model such as GBDT can automatically select features that are important for anomaly detection (e.g., compromised account detection). Since features that are not important to anomaly detection may be eliminated, anomaly detection may be performed efficiently.

Problem Formulation

Suppose we have training samples $x^{tr}$ and test samples $x^{te}$. The training dataset consist only of inliers (e.g., without any compromised e-mail data), while the test dataset include both inliers and outliers (e.g., compromised and non-compromised e-mail account data). The goal is to detect outliers (e.g., compromised account data) in the test data set using the training dataset, which consists of only inliers. In practice, this problem setting is suited for commercial e-mail service, since it is relatively easy to obtain non-compromised data.

A statistical approach of the inlier-based anomaly detection has been proposed. (Song et al, Relative novelty detection, In *International Conference on Artificial Intelligence*, 536-543, 2009; Hido et al, Statistical outlier detection using direct density ratio estimation, *Knowledge and Information Systems* 26(2):309-336, 2011). Suppose training samples are sampled i.i.d. from a distribution with density $p_{tr}(x)$ and test samples are sampled i.i.d. from a distribution with density $p_{te}(x)$. In this approach, test samples with low data densities may be regarded as anomalies (e.g., compromised e-mail accounts).

The relative importance between the training data density $p_{tr}(x)$ and the test data density $p_{te}(x)$ may be represented as an anomaly score. (Yamada et al, Relative density-ratio estimation for robust distribution comparison, *Neural computation* 25(5):1324-1370, 2013.) The relative importance $r_\alpha(x)$ may be represented as follows:

$$r_\alpha(x) = \frac{p_{tr}(x)}{\alpha p_{tr}(x) + (1-\alpha)p_{te}(x)}, \quad \text{Equation 1}$$

where $0 \leq \alpha \leq 1$ is the tuning parameter which controls detection sensitivity. If an anomaly score $r_\alpha(x)$ is smaller than a pre-defined threshold, the data x may be regarded as an anomaly. If $\alpha=0$, the relative importance reduces to the importance score used in Hido et al. 2011. When the training and test distributions are the same, i.e., there exist no anomalies, the relative importance is one. On the other hand, if there exist anomalous samples in the test data, the relative importance tends to take small values.

Figure 2:
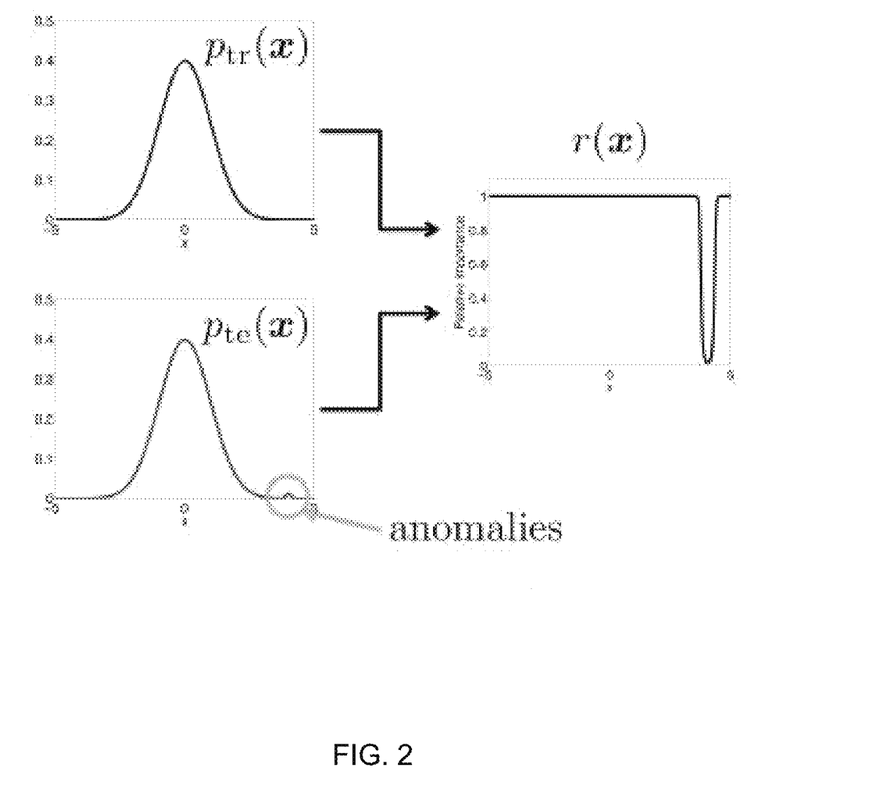
FIG. 2 is a diagram illustrating an example inlier-based anomaly detection framework.

FIG. 2 is a diagram illustrating an example inlier-based anomaly detection framework. A naive approach to performing relative importance estimation is to first estimate training dataset and test dataset densities separately and compute the ratio of the estimated densities. However, since density estimation itself is known to be difficult to accomplish, this two-step approach tends to perform poorly. Recently, a direct relative importance estimation approach without performing estimation of the training dataset and test dataset densities has showed promising results for anomaly detection problems. (Yamada et al. 2013).

In accordance with various embodiments, a direct relative importance ratio estimation approach may be performed. There are two key challenges in relative importance estimation for compromised e-mail account detection. First, the number of data samples tends to be large in commercial e-mail systems. Second, spammer characteristics change dynamically. That is, features important for discriminating compromised and non-compromised accounts often change frequently. Therefore, feature selection to select a set of features used to perform anomaly detection is a desirable component in performing anomaly detection such as compromised e-mail account detection.

Relative Unconstrained Least-Squares Importance Fitting (RuLSIF)

One existing relative density ratio estimation method is relative unconstrained least-squares importance fitting (RuLSIF). (Yamada et al. 2013). In this method, the relative density-ratio $r_\alpha(x)$ may be modelled by the following kernel model:

$$r_\alpha(x;\theta) := \sum_{\ell=1}^{n_{to}} \theta_\ell K(x, x_\ell^{te}), \quad \text{Equation 2}$$

where $\theta:=(\theta_1, \ldots, \theta_{n_{te}})^T$ are parameters to be learned from data samples, $x^T$ denotes the transpose of a matrix or vector, and K(x, x') is a basis function. In one embodiment, the Gaussian kernel is employed:

$$K(x, x') = \exp\left(-\frac{\|x - x'\|^2}{2\sigma^2}\right),$$

where $\alpha$ (>0) is the kernel width.

The parameters $\theta$ are estimated so that the following squared-error J is minimized:

$$J(\theta) := \frac{1}{2} E_{q\alpha(x)}[(r_\alpha(x;\theta) - r_\alpha(x))^2]$$

$$= \frac{\alpha}{2} E_{p(x)}[r_\alpha(x;\theta)^2] + \frac{(1-\alpha)}{2} E_{p'(x)}[r_\alpha(x;\theta)^2] -$$

$$E_{p(x)}[r_\alpha(x;\theta)] + \text{Const.},$$

where $r_\alpha(x)q_\alpha(x)=p(x)$ was used in the third term. (Yamada et al. 2013).

Approximating the expectations by empirical averages, we can obtain Equation 3:

$$\hat{\theta} := \operatorname{argmin}_{\theta \in \mathbb{R}^n}\left[\frac{1}{2}\theta^T \hat{H}\theta - \hat{h}^T \theta + \frac{\lambda}{2}\theta^T \theta\right],$$

where $\lambda$ ($\geq 0$) is the regularization parameter.

$\hat{H}$ and $\hat{h}$ are defined as $$\hat{H}_{\ell,\ell'} := \frac{\alpha}{n_{te}}\sum_{i=1}^{n_{to}} K(x_i^{te}, x_\ell^{te})K(x_i^{te}, x_{\ell'}^{te}) + \frac{(1-\alpha)}{n_{tr}}\sum_{j=1}^{n_{tr}} K(x_j^{tr}, x_\ell^{te})K(x_j^{tr}, x_{\ell'}^{te}),$$

$$\hat{h}_\ell := \frac{1}{n_{te}}\sum_{i=1}^{n_{to}} K(x_i^{te}, x_i^{te}).$$

Taking derivative of Eq.(3) with respect to $\theta$ and equating it to zero, we have the analytical solution, which is represented in Equation 4:

$$\theta = (\hat{H} + \lambda I_{n_{te}})^{-1}\hat{h},$$

where $I_{n_{te}}$ denotes the $n_{te}$-dimensional identity matrix. Finally, an estimated relative importance score is given as $$\hat{r}_\alpha(x) := r_\alpha(x;\hat{\theta}) = \sum_{\ell=1}^{n_{te}} \hat{\theta}_\ell K(x, x_\ell^{te}).$$

Deviation from the profile is identified as an anomaly.

The performance of RuLSIF depends on the choice of the kernel width of the Gaussian kernel and the regularization parameter $\lambda$. Model selection of RuLSIF is possible based on cross-validation (CV) with respect to the squared-error criterion J. Learning RuLSIF has complexity $O(n^3_{te})$ due to the matrix inversion. When the number of test samples is large, the number of kernels in Eq. (2) may be reduced to $b \ll n_{te}$. Then, the inverse matrix in Eq. (4) can be efficiently computed with complexity $O(b^3)$.

RuLSIF performs favorably for small scale inlier-based anomaly detection problems. However, for a large amount of data (e.g., $n_{tr} = n_{te} > 106$), the estimation of RuLSIF tends to be poor. In addition, it is not possible to select features in RuLSIF, and thus the anomaly detection performance tends to be degraded if unimportant features are included.

Relative Importance Estimation Based on Two-Class Classification

In accordance with various embodiments, an inlier-based anomaly detection approach within the relative density ratio estimation framework is proposed. More particularly, the relative importance estimation problem may be reformulated into a two-class classification problem. As will be described in further detail below, in one embodiment, an efficient direct relative importance estimation approach may be implemented using a Gradient Boosting Decision Tree (GBDT).

It has been experimentally verified that setting $\alpha = 0.5$ is a good heuristic for anomaly detection. (Yamada et al. 2013). Based on this fact, the following relative importance for anomaly detection may be implemented, which is represented as Equation 5:

$$r(x) = \frac{2 p_{tr}(x)}{p_{tr}(x) + p_{te}(x)}.$$

It may be verified that if x is a normal sample, r(x) tends to have a score close to 1. In contrast, if x is an anomalous sample, r(x) tends to have a lower score.

Let us assume that $p_{tr}(x)$ is the density of positive class (y=+1) and $p_{te}(x)$ is the density of negative class (y=−1), then we can interpret the relative importance as the conditional probability p(y=+1|x). Thus, by merging training samples and test samples, where the set of training samples $x^{tr}$ is labeled as the positive class (y=+1) and the set of test samples $x^C$ is labeled as the negative class (y=−1), we can use any supervised two-class classification methods for estimating the relative importance.

In one embodiment, the supervised two-class classification method may include the gradient boosting decision tree (GBDT) algorithm. The GBDT algorithm is a nonlinear model, it can select features that are important for classification, it is computationally efficient, and it scales well for the number of samples.

The GBDT model includes a group of trees, and may be represented as:

$$f_M(x) = \sum_{m=1}^{M} \beta_m T(x; \Theta_m),$$

where $\beta_m$ and $\theta_m$ are the weight parameters and the model parameters for tree m, and M is the number of trees. β and θ may be estimated by a two-step approach as follows:

Estimating $\theta_m$:

$$\tilde{\Theta}_m = \underset{\Theta}{\operatorname{argmin}} \sum_{i=1}^{n} (-g_{i,m} - T(x_i; \Theta))^2, \text{ where}$$

$$g_{i,m} = \left[ \frac{\partial L(y_i, f(x_i))}{\partial f(x_i)} \right]_{f=f_{m-1}}$$

is the gradient over current prediction function. L(y, f(x)) is a loss function.

Estimating $\beta_m$:

$$\hat{\beta}_m = \underset{\beta}{\operatorname{argmin}} \sum_{i=1}^{n} L(y_i, f_{m-1}(x_i)) + \beta T(x_i; \hat{\Theta}_m).$$

The above-described implementation employs a GBDT algorithm. However, the disclosed embodiments may employ any supervised two-class classification method. For example, a linear support vector machine (SVM), logistic regression, or neural network may employed as the supervised two-class classification method.

Figure 3:
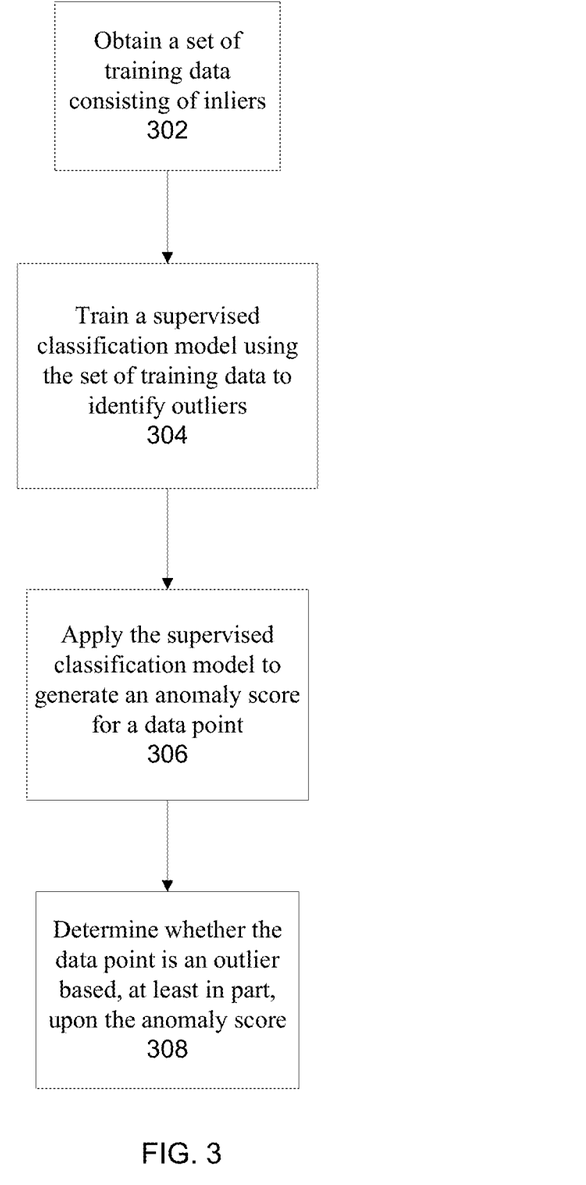
FIG. 3 is a process flow diagram illustrating an example method of performing anomaly detection in accordance with various embodiments.

FIG. 3 is a process flow diagram illustrating an example method of performing anomaly detection in accordance with various embodiments. A set of training data consisting of inliers may be obtained at 302. More particularly, the set of training data may include values of a set of one or more features for each data point in the set of training data. The values of each set of features may be represented by a feature vector.

In one embodiment, the set of features may correspond to emails that are sent or received via an email system. For example, the set of features may include an identity of an individual user sending an electronic mail message (e.g., sender email address), an identity of an individual user receiving the electronic mail message (e.g., receiver email address), and a time that the electronic mail message was sent. Values of various features may be extracted from the electronic mail message. In addition, the set of features may include features of the user (e.g., receiver or addressee) that is receiving the electronic mail message and/or features of the user (e.g., sender) that is sending the electronic mail message. Values of such user features may be obtained from a user profile such as that described herein.

A supervised classification model may be trained at 304 using the set of training data to identify outliers. The supervised classification model may include a two-class classification model that estimates a relative importance measure. As described herein, the relative importance measure may be a ratio of training and test data densities. In one embodiment, the relative importance measure may be estimated using Equation 5 described above. The supervised classification model may include a GBDT algorithm, a linear support vector machine (SVM), logistic regression, or a neural network. As described herein, the supervised classification model may perform feature selection to select one or more features upon which to generate anomaly scores for data points.

The supervised classification model may be applied at 306 to generate an anomaly score for a data point. As described herein, the supervised classification model may be used to estimate the relative importance, which is used as the anomaly score. In one embodiment, the relative importance may be represented by Equation 5.

It may be determined at 308 whether the data point is an outlier based, at least in part, upon the anomaly score. More particularly, it may be determined whether the data point is an outlier by comparing the anomaly score to a threshold value. Thus, if the anomaly score is higher (or lower) than the threshold, the anomaly score may indicate that the data point is an outlier. Alternatively, if the anomaly score is below or equal to the particular threshold, the anomaly score may indicate that the data point is an inlier.

In one embodiment, the set of training data may include email data corresponding to non-spammers. Thus, determining whether the data point is an outlier may result in determining whether the data point is a compromised email account.

In another embodiment, the set of training data may include images of semiconductors. Therefore, determining whether the data point is an outlier may result in determining whether the data point corresponds to a faulty semiconductor.

In yet another embodiment, the set of training data may include digital voice data corresponding to human speakers. Thus, determining whether the data point is an outlier may result in determining whether the data point corresponds to an impostor or malicious user.

Although the above-described embodiments are described with reference to detecting compromised accounts, it is important to note that this example is merely illustrative. Therefore, the disclosed embodiments may be applied to a variety of scenarios in which anomaly detection is appropriate.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 4:
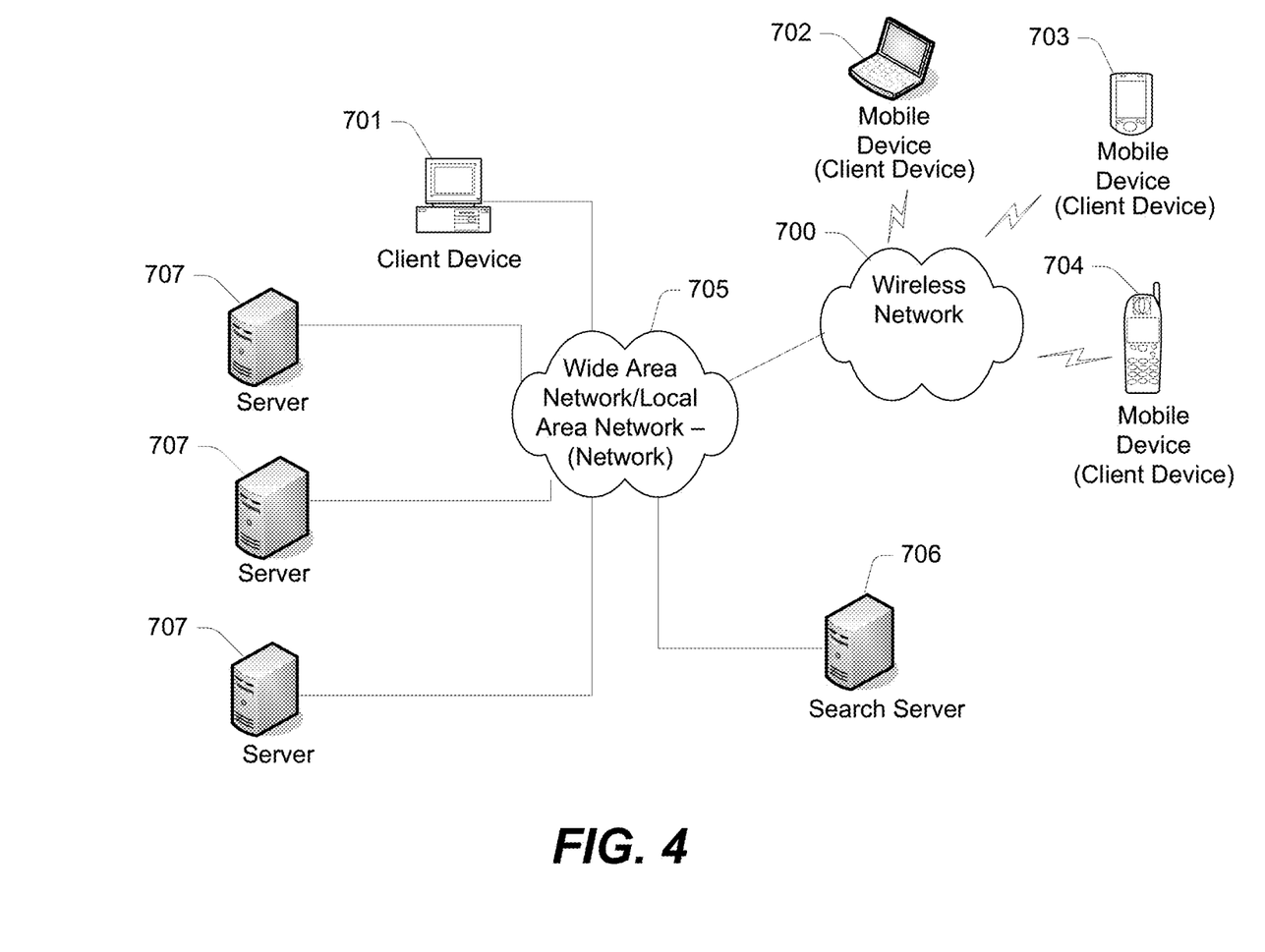
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

Figure 5:
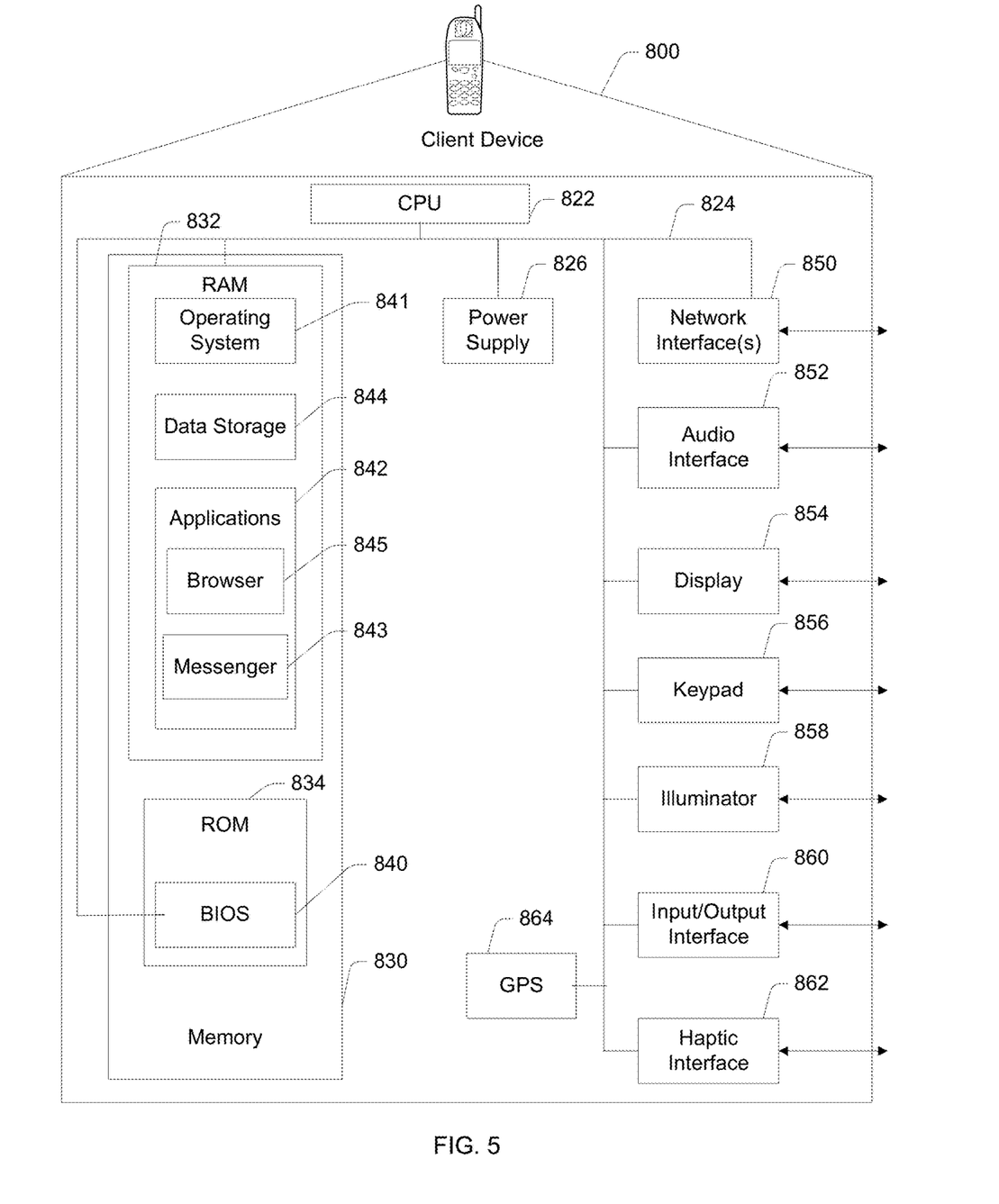
FIG. 5 is a schematic diagram illustrating an example client device in which various embodiments may be implemented.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 6:
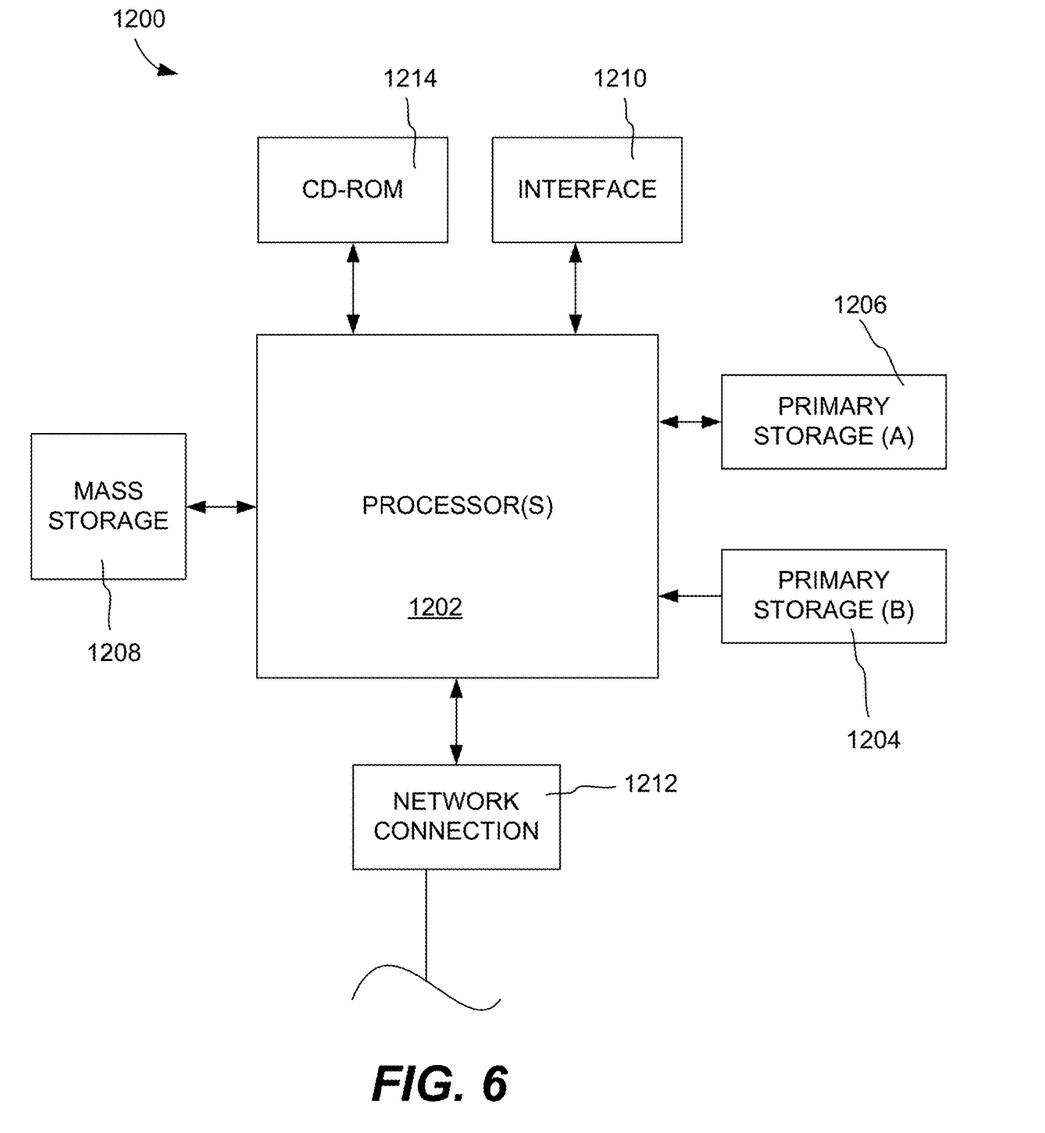
FIG. 6 is a schematic diagram illustrating an example computer system in which various embodiments may be implemented.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may be a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    extracting, for each one of a plurality of electronic mail (email) messages, a set of feature values corresponding to a set of features from the corresponding one of the plurality of email messages, each of the plurality of email messages being received from of a corresponding non-spammer email source;
    updating, by one or more servers, a set of training data comprising data corresponding to email messages received from non-spammer email sources such that the set of training data comprises the set of feature values for each of the plurality of email messages;

training, by the one or more servers, a supervised two-class classification model using the set of training data to identify outliers;
selecting, by the supervised two-class classification model, one or more features associated with more effective anomaly detection than one or more other features;
determining a training data density associated with non-spammer email sources based, at least in part, on the set of training data comprising the data corresponding to the email messages received from non-spammer email sources;
determining a test data density associated with spammer email sources based, at least in part, on a set of test data comprising data corresponding to email messages received from spammer email sources;
estimating a relative importance measure, using the supervised two-class classification model, based, at least in part, on the training data density associated with non-spammer email sources and the test data density associated with spammer email sources, wherein the relative importance measure weighs the training data density associated with non-spammer email sources more heavily than the test data density associated with spammer email sources;
receiving, by the one or more servers, an email message;
applying, by the one or more servers, the supervised two-class classification model to generate an anomaly score for the email message according to the one or more features selected by the supervised two-class classification model and the relative importance measure; and
determining, by the one or more servers, whether the email message is received from a spammer email source based, at least in part, on the anomaly score.

2. The method as recited in claim 1, wherein feature values extracted from the plurality of email messages correspond to features comprising a first identity of a first user sending a first email message, a second identity of a second user receiving the first email message, a time that the first email message was sent, a first user feature obtained from a first user profile of the first user, and a second user feature obtained from a second user profile of the second user.

3. The method as recited in claim 1, wherein the supervised two-class classification model comprises a gradient boosted decision tree (GBDT) algorithm.

4. The method as recited in claim 1, wherein the selecting comprises:
eliminating, by the supervised two-class classification model, one or more second features associated with anomaly detection that is not effective.

5. The method as recited in claim 1, wherein the set of training data comprises digital voice data.

6. The method as recited in claim 1, comprising:
processing the email message according to a result of determining whether the email message is received from a spammer email source.

7. An apparatus, comprising:
at least one processor; and
a memory storing thereon computer-readable instructions, the computer-readable instructions being configured such that, when executed by the at least one processor, the computer-readable instructions cause the at least one processor to:
extract, for each one of a plurality of digital images of a corresponding one of a plurality of non-faulty semiconductors, a set of feature values corresponding to a set of features from the corresponding one of the plurality of digital images;
update a set of training data comprising data corresponding to digital images of non-faulty semiconductors such that the set of training data comprises the set of feature values for each of the plurality of digital images;
train a supervised two-class classification model using the set of training data to identify faulty semiconductors;
determine a training data density associated with non-faulty semiconductors based, at least in part, on the set of training data comprising the data corresponding to digital images of non-faulty semiconductors;
determine a test data density associated with faulty semiconductors based, at least in part, on a set of test data comprising data corresponding to digital images of faulty semiconductors;
estimate a relative importance measure, using the supervised two-class classification model, based, at least in part, on the training data density associated with non-faulty semiconductors and the test data density associated with faulty semiconductors, wherein the relative importance measure weighs the training data density associated with non-faulty semiconductors more heavily than the test data density associated with faulty semiconductors;
obtain an image of a semiconductor;
apply the supervised two-class classification model to generate an anomaly score for the semiconductor using the image according to one or more features selected by the supervised two-class classification model and the relative importance measure; and
determine whether the semiconductor is a faulty semiconductor based, at least in part, on the anomaly score.

8. The apparatus as recited in claim 7, the relative importance measure being a ratio of the training data density and the test data density.

9. The apparatus as recited in claim 7, wherein the supervised two-class classification model comprises a gradient boosted decision tree (GBDT) algorithm.

10. The apparatus as recited in claim 7, wherein the supervised two-class classification model performs feature selection to select the one or more features upon which to generate anomaly scores for semiconductors.

11. A computer program product, comprising one or more non-transitory computer readable media having computer program instructions stored therein, the computer program instructions being configured such that, when executed by one or more processors, the computer program instructions cause the one or more processors to:
obtain a set of training data comprising data corresponding to inliers, each of the inliers comprising an electronic mail (email) message received from a non-spammer, an image of a non-faulty semiconductor, or digital voice data of an individual;
train a supervised two-class classification model using the set of training data to identify outliers, each of the outliers comprising an email message received from a spammer, an image of a faulty semiconductor, or digital voice data that is not of the individual;
select, by the supervised two-class classification model, one or more features determined to be effective for anomaly detection;
determining a training data density associated with non-spammer email sources, non-faulty semiconductors, or digital voice data of the individual based, at least in part, on the set of training data comprising the data corresponding to inliers;

determining a test data density associated with spammer email sources, faulty semiconductors, or digital voice data that that is not of the individual based, at least in part, on a set of test data comprising data corresponding to email messages received from spammer email sources, data corresponding to digital images of faulty semiconductors or data corresponding to digital voice data that is not of the individual;

estimating a relative importance measure, using the supervised two-class classification model, based, at least in part, on the training data density associated with non-spammer email sources, non-faulty semiconductors, or digital voice data of the individual and the test data density associated with spammer email sources, faulty semiconductors, or digital voice data that that is not of the individual, wherein the relative importance measure weighs the training data density associated with associated with non-spammer email sources, non-faulty semiconductors, or digital voice data of the individual more heavily than the test data density associated with spammer email sources, faulty semiconductors, or digital voice data that that is not of the individual;

apply the supervised two-class classification model to generate an anomaly score for second data comprising a set of feature values for one or more features according to the one or more features selected by the supervised two-class classification model and the relative importance measure, wherein the second data corresponds to at least one of at least one email message, at least one digital voice data, or at least one image of at least one semiconductor; and determine whether the second data corresponds to an outlier based, at least in part, on the anomaly score.

12. The computer program product as recited in claim 11, the computer program instructions configured to cause the one or more processors to:
determine whether a data point is indicative of an imposter based, at least in part, on whether the second data corresponds to an outlier.

13. The computer program product as recited in claim 12, the computer program instructions configured to cause the one or more processors to:
determine the test data density based, at least in part, on digital voice data that is from one or more other individuals that are not the individual.

14. The computer program product as recited in claim 13, the relative importance measure being a ratio of the training data density and the test data density.

15. The computer program product as recited in claim 11, wherein the supervised two-class classification model comprises a gradient boosted decision tree (GBDT) algorithm.

16. The computer program product as recited in claim 11, wherein the outlier is associated with a second email message received from a second spammer.

17. The computer program product as recited in claim 11, the computer program instructions configured to cause the one or more processors to:
determine whether a data point is indicative of a compromised email account based, at least in part, on whether the second data corresponds to an outlier.

18. The computer program product as recited in claim 11, wherein the outlier is associated with a second image of a second faulty semiconductor.

19. The computer program product as recited in claim 11, the computer program instructions configured to cause the one or more processors to:
determine whether a data point is indicative of a faulty semiconductor based, at least in part, on whether the second data corresponds to an outlier.

20. The computer program product as recited in claim 11, wherein the outlier is associated with second digital voice data of a second individual that is not the individual.

21. The computer program product as recited in claim 11, the computer program instructions configured to cause the one or more processors to:
process the at least one email message, the at least one digital voice data, or the at least one image of the at least one semiconductor according to a result of determining whether the second data corresponds to an outlier.

22. An apparatus, comprising:
at least one processor; and
a memory storing thereon computer-readable instructions, the computer-readable instructions being configured such that, when executed by the at least one processor, the computer-readable instructions cause the at least one processor to:
extract, for each one of a plurality of digital images of a corresponding one of a plurality of non-faulty products, a set of feature values corresponding to a set of features from the corresponding one of the plurality of digital images;
update a set of training data comprising data corresponding to digital images of non-faulty products such that the set of training data comprises the set of feature values for each of the plurality of digital images;
train a supervised two-class classification model using the set of training data to identify faulty products;
determine a training data density associated with non-faulty products based, at least in part, on the set of training data comprising the data corresponding to digital images of non-faulty products;
determine a test data density associated with faulty products based, at least in part, on a set of test data comprising data corresponding to digital images of faulty products;
estimate a relative importance measure, using the supervised two-class classification model, based, at least in part, on the training data density associated with non-faulty products and the test data density associated with faulty products, wherein the relative importance measure weighs the training data density associated with non-faulty products more heavily than the test data density associated with faulty products;
obtain an image of a product;
apply the supervised two-class classification model to generate an anomaly score for the product using the image according to one or more features selected by the supervised two-class classification model and the relative importance measure; and
determine whether the product is a faulty product based, at least in part, on the anomaly score.

* * * * *